United States Patent [19]

Nemoto

[11] Patent Number: 5,337,998

[45] Date of Patent: Aug. 16, 1994

[54] DEVICE FOR ATTACHING MAGNETIC DISK UNIT

[75] Inventor: Takahiro Nemoto, Hanamaki, Japan

[73] Assignee: Matsushita Electric Industrial Co., Ltd., Osaka, Japan

[21] Appl. No.: 886,284

[22] Filed: May 21, 1992

[30] Foreign Application Priority Data

May 27, 1991 [JP] Japan .................. 3-121199

[51] Int. Cl.5 ................................. F16M 13/00
[52] U.S. Cl. ..................... 248/634; 360/97.01
[58] Field of Search ............ 248/634, 201, 605, 609, 248/675, 680, 635; 360/97.01, 97.02, 97.03

[56] References Cited

U.S. PATENT DOCUMENTS

| | | | |
|---|---|---|---|
| 2,460,596 | 2/1949 | Roche | 248/609 X |
| 3,599,961 | 8/1971 | Morgan | 248/316.1 X |
| 3,916,488 | 11/1975 | Gazda et al. | 248/74.3 X |
| 4,713,714 | 12/1987 | Gatti et al. | 360/97.01 X |
| 4,825,315 | 4/1989 | Hirose et al. | 360/97.01 |
| 4,915,273 | 4/1990 | Allen | 248/201 X |
| 5,079,655 | 1/1992 | Yagi | 360/97.02 |
| 5,150,267 | 9/1992 | Reinisch | 360/97.02 |

FOREIGN PATENT DOCUMENTS 278086  3/1990  Japan .

Primary Examiner—David A. Scherbel
Assistant Examiner—Korie Chan
Attorney, Agent, or Firm—Stevens, Davis, Miller & Mosher

[57] ABSTRACT

Rubber having a sheet shape is sandwiched between two metal plates. A mold and heat are utilized to integrally bond the rubber to the metal plates. Thus, a fixing bracket assembly is manufactured which is secured by a screw and a stepped screw to both sides of a magnetic disk unit. Thus, it is possible to construct a fixing bracket assembly which conserves space and has a high damping capacity for vibrations, and which reduces the strain on the magnetic disk unit when it is mounted.

4 Claims, 3 Drawing Sheets

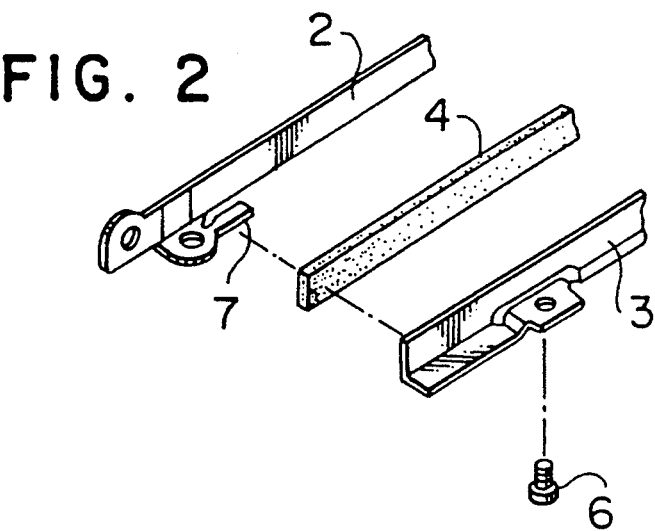
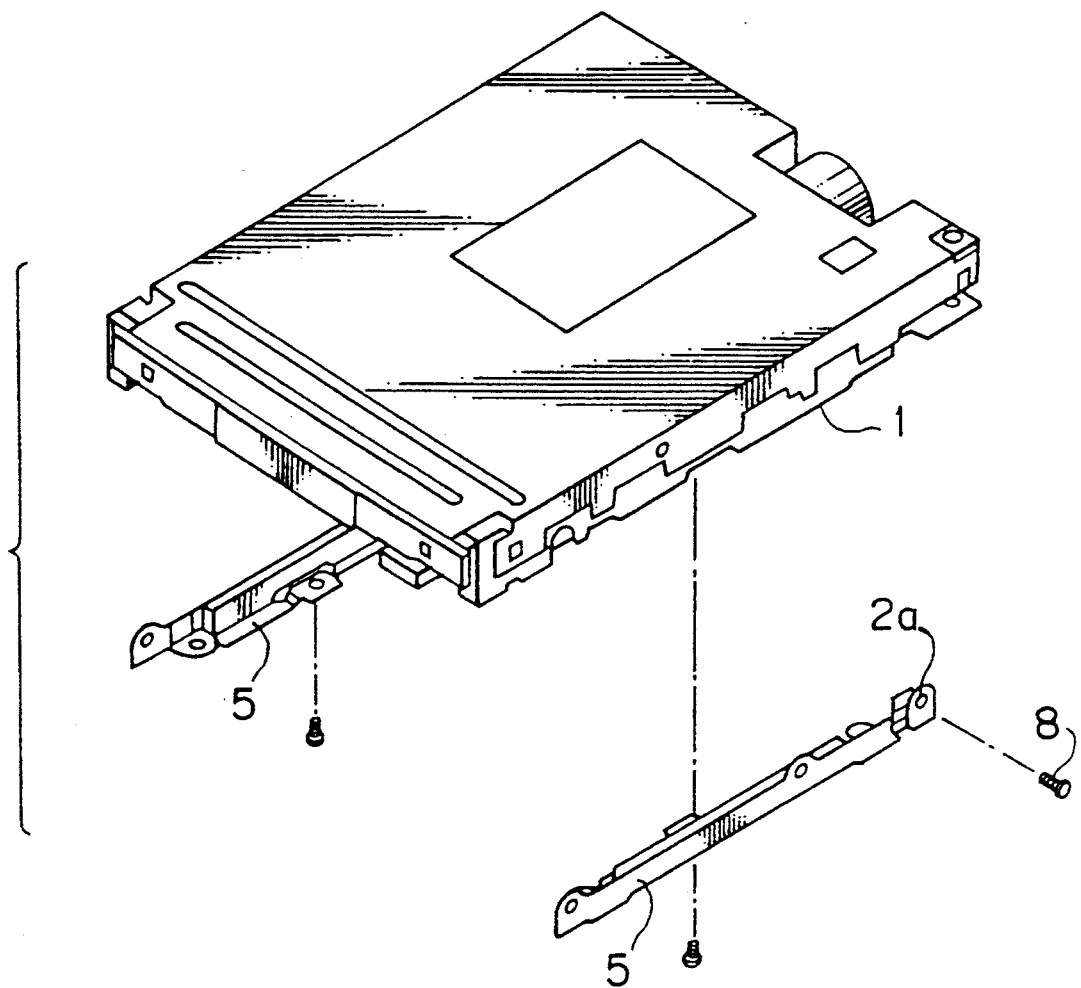

DEVICE FOR ATTACHING MAGNETIC DISK UNIT

BACKGROUND OF THE INVENTION

1. Field of the Invention

The present invention relates to a device for attaching a magnetic disk unit for use as an external storage unit of a host computer, such as a personal computer, a word-processor or a workstation.

2. Description of the Related Art

FIG. 1 is a perspective view showing the structure of a conventional device for attaching a magnetic disk unit (hereinafter referred to as an attaching device). The attaching device has brackets 12 and one or two screws 13. The brackets 12 are used to connect the magnetic disk unit 11 with a host computer (on a system side), and the screws 13 are used to fix the brackets 12 to the magnetic disk unit 11 directly or through a small cylindrical rubber 14.

As systems have become more portable, magnetic disk units have become thinner. As a result, the stiffness of such a conventional attaching device decreases remarkably. In addition, the attaching device has poor vibration-damping properties because the brackets 12 are fixed directly to the magnetic disk unit 11, or because, even when these components are fixed together through the rubber 14, the rubber 14 is still slightly attached to a certain portion of the magnetic disk unit 11. Thus, although specifications for the magnetic disk unit are severe, the vibration-damping properties and impact resistance of the magnetic disk unit 11 deteriorate. Also, because an amount of strain on the magnetic disk unit 11 increases when it is attached to the system side, it is likely to deviate from tracks, and thus errors are likely to occur.

SUMMARY OF THE INVENTION

The present invention solves such problems of the prior art, and an object thereof is to provide a device for attaching a magnetic disk unit which has enhanced impact resistance and vibration-damping properties, whose performance is not affected by the location where the magnetic disk unit is mounted, and use of which conserves space and reduces the amount of strain on the magnetic disk unit when it is mounted on a system.

To achieve the above object, this invention provides a device for attaching a magnetic disk unit, comprising: a metal plate to be secured to the magnetic disk unit; another metal plate to be secured to a system side; and a sheetlike elastic member interposed between the metal plates and integrally bonded by heat to the metal plates.

It is preferable that the attaching device be constructed so that an elastic member for external conduction can be interposed between the metal plates.

It is also preferable that the metal plate to be secured to the magnetic disk unit is provided with a receiving hole, and that this metal plate is secured to the magnetic disk unit by a stepped screw which is inserted into the receiving hole with a gap between the stepped screw and the receiving hole.

According to the above structure, the sheetlike elastic member, which is integrally sandwiched between and bonded by heat to the metal plates, serves as a high-performance damper regardless of the location where the magnetic disk unit is mounted, thereby being capable of reducing excitation acceleration applied to the magnetic disk unit. It is therefore possible to improve vibration-damping properties and to relax strain (deformation) on the magnetic disk unit, this strain being caused by the deformation on the sheetlike elastic member when the magnetic disk unit is mounted.

When an elastic member is provided which is electrically conductive for external conduction, the magnetic disk unit can be electrically conductive to the system. When such a member is not provided, the magnetic disk unit can be insulated from the system. It is thus possible to make the magnetic disk unit either electrically conductive to or insulated from the system, thus readily coping with various specifications.

Furthermore, the stepped screw functions as a stopper when an excessive impact or like are applied. It is therefore possible to prevent not only the metal plates from being permanently deformed but also the elastic member from being broken and peeled.

BRIEF DESCRIPTION OF THE DRAWINGS

FIG. 2 is a perspective view showing essential components of an embodiment of a device for attaching a magnetic disk in accordance with the present invention;

FIG. 3 is a perspective view showing the entire structure of the embodiment of FIG. 2; and illustrates features of the embodiment of FIG. 2.

DESCRIPTION OF THE PREFERRED EMBODIMENT

Figure 1:
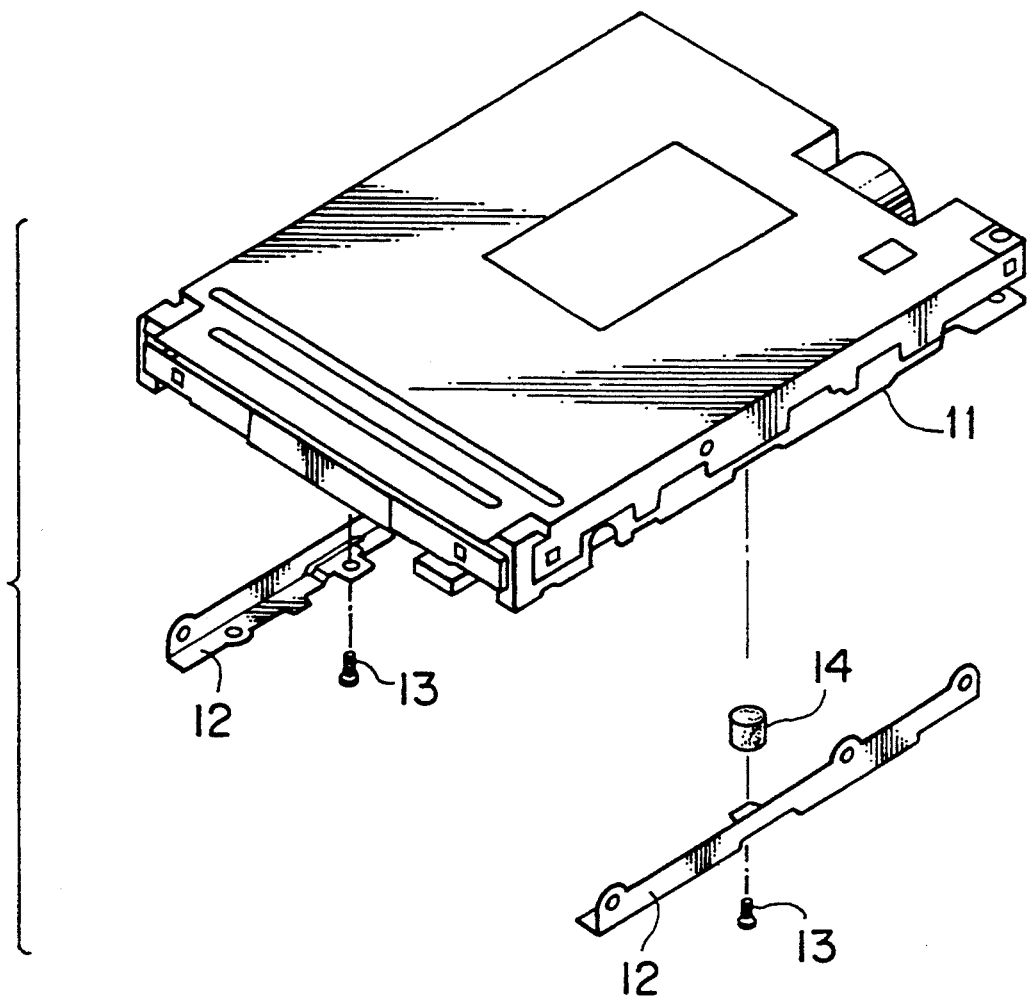
FIG. 1 is a perspective view showing a conventional devices for attaching a magnetic disk unit.

An embodiment of a device for attaching a magnetic disk unit (hereinafter referred to as an attaching device) in accordance with the present invention will be described with reference to FIGS. 2 and 3. The attaching device includes a fixing bracket 2, made of a metal plate, such as a SECC sheet metal, which is used for securing a magnetic disk unit 1 to a system. The fixing bracket 2 has a shape of a flat plate, except that it has a burr portion for a female thread to be attached to the system side. The attaching device also includes a fixing sheet metal 3 and a sheetlike elastic member 4. The fixing sheet metal 3 is made of a metal plate, such as a SUS material, and is attached to the magnetic disk unit 1 so as to form an integral structure. The elastic member 4 is not likely to be permanently set, and has excellent temperature and frequency characteristics. It also has excellent vibration-damping properties (loss factor ranging from 0.7 to 1). The elastic member 4 is stamped to have a sheet shape by which a bond area can be obtained easily. For example, a HDR-C 40 rubber manufactured by NOK Co., Ltd. may be used as the sheetlike elastic member 4.

The elastic member 4, to which an adhesive is applied, is sandwiched by a mold between the fixing bracket 2 and sheet metal 3. Then, the elastic member 4 is reliably adhered to these two components when pressure and heat are applied to it. A fixing bracket assembly 5 forming one component is thus obtained.

The fixing bracket assembly 5 provides insulation between the magnetic disk unit 1 and the system. When such a fixing bracket assembly 5 conforms to the specifications of the system, it can be employed directly. However, when it is desirable that the assembly 5 is electrically conductive, electrically-conductive rubber is used as the elastic member 4; or a gland spring 7, such as a SUS spring material, which is an elastic member electrically conductive to the outside, is secured to the fixing bracket 2 and sheet metal 3 by spot welding or caulking.

Figure 4:
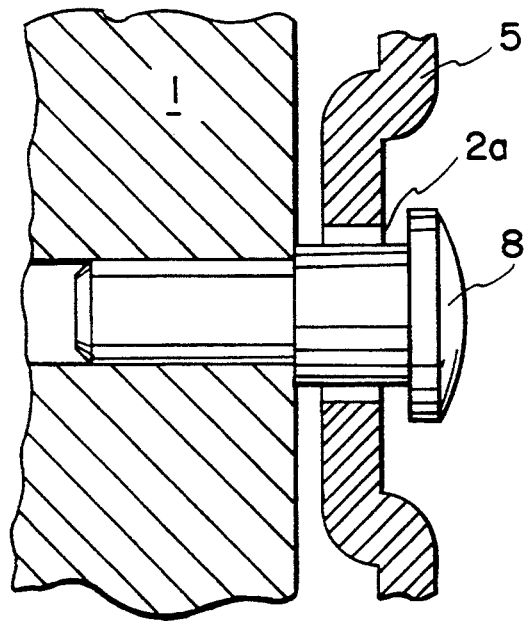

The thus-constructed fixing bracket assembly 5 is secured to the magnetic disk unit 1 by a screw 6 and a stepped screw 8. There is an ample clearance between the stepped screw 8 and a receiving hole 2a, into which the screw 8 is inserted when the assembly 5 is secured to the magnetic disk unit 1. The assembly 5 is secured to the magnetic disk unit 1 so that there is an ample gap between a head of the stepped screw 8 and a side surface of the fixing bracket 2 (see FIG. 4).

The operation of the above embodiment will now be described. When vibrations are applied to the system, vibrations of approximately the same degree are also applied to the fixing bracket 2. However, since such vibrations are attenuated by the elastic member 4, the excitation acceleration being applied to the magnetic disk unit 1 decreases. When the fixing bracket 2 is attached to the system by the screw 6, the elastic member 4 is deformed, thereby relaxing stress being applied to the magnetic disk unit 1. As a result, an amount of strain on the magnetic disk unit 1 is reduced. When an excessive impact is applied which may move the fixing bracket 2 against the stepped screw 8, these two components come into close contact with each other. The stepped screw 8 serves as a stopper or limiter to such an impact. Thus, the magnetic disk unit 1 is capable of moving freely without restricting the movement of the elastic member 4 until the fixing bracket 2 and the stepped screw 8 come into close contact with each other.

According to the above embodiment, because the fixing bracket 2 has a substantially the flat-plate shape to follow the system, the stiffness of the fixing bracket 2 is not affected. Vibration properties are dominant which are determined by the attenuation constant, stiffness (natural frequency), etc. of the elastic member 4. Although the positions where the fixing bracket 2 is mounted on the system varies (in this embodiment, the fixing bracket 2 can be mounted on the system at positions which span is 60 mm, 70 mm or 90 mm), differences are not likely to occur in the vibration-damping properties due to the disk unit 1 being mounted in various locations. The reason for this is that the elastic member 4 is long and has a sheetlike shape. In addition, because of the sheetlike shape of the elastic member 4, it has a wide sectional area, although it does not occupy much space. Consequently, the vibration-damping properties and the bond strength of the attaching device can be increased. Also, it is possible to reduce an amount of permanent set of the elastic member 4 after it has borne the load of the magnetic disk unit for long periods of time. Dimensional accuracy can be obtained more easily with the elastic member 4 having a sheetlike shape than with a member having a standard rubber shape. It is also possible to significantly reduce an amount of strain of the magnetic disk unit 1.

By utilizing the mold and applying pressure and heat to the elastic member 4, it is reliably bonded, and therefore failures, such as operational variability, are not likely to occur. Also, since the gland spring 7 is connected by caulking or spot welding, contact resistance is reduced. In addition, because of the elasticity of the gland spring 7, it is capable of moving freely without hindering the movement of the elastic member 4, and vibration-damping properties are not adversely affected.

When it is desirable that the magnetic disk unit 1 be insulated from the system, the gland spring 7 is not provided. Because of the stepped screw 8, the fixing bracket 2 can move without any trouble, and thus the vibration-damping properties are not adversely affected. The stepped screw 8 functions as a stopper (limiter) when excessive impact is applied, thereby preventing not only the fixing bracket 2 from being permanently deformed but also the elastic member 4 from being broken and peeled.

As described above, the present invention provides the following advantages:

(1) Because of the sheetlike elastic member, space can be conserved; a bracket assembly which has a high damping capacity for vibrations can be constructed; and dimensional accuracy can be more easily secured.

(2) Since the elastic member is formed like a sheet, a wide sectional area can be obtained. It is consequently possible to increase the bond strength, and to reduce an amount of permanent set of the elastic member and an amount of strain of the magnetic disk unit when the attaching device is mounted.

(3) The metal plate (fixing bracket) has the shape of a substantially flat plate, and the elastic member is formed like a sheet. It is therefore possible to reduce differences in vibration-damping properties caused by the attaching device being mounted in various locations of the system.

(4) The reliability of the bond between the metal plate and the elastic member improves since the metal plate can be integrally bonded by heat to the sheetlike elastic member.

(5) The system can easily be made electrically conductive to or insulated from the magnetic disk unit by respectively providing or not providing an elastic member which is electrically conductive to the outside.

(6) The stepped screw functions as a stopper for an excessive impact, thereby preventing not only the metal plate from being permanently deformed but also the sheetlike elastic member from being broken and peeled.

What is claimed is:

1. A device for attaching a magnetic disk unit, comprising:
    a first plate to be secured to the magnetic disk unit;
    a second plate to be secured to a system side of an electronic device; and
    an elongated sheetlike elastic member which has first and second opposed surfaces which each have a substantially rectangular shape and (b) is interposed between said first and second metal plates and integrally bonded by heat with said first and second plates, said sheet like elastic member having a loss factor ranging from 0.7 to 1; and
    wherein said first and second plates are formed of metal, and one of said first and second plates is provided with an electrically conductive member which maintains contact between said first and second plates.

2. A device for attaching a magnetic disk unit according to claim 1, wherein said first and second plates are metal, and
    said elastic member is electrically conductive.

3. A device for attaching a magnetic disk unit according to claim 1, wherein said first plate is provided with a receiving hole having a diameter larger than a diameter of a stepped screw inserted into said receiving hole, said first plate being secured to the magnetic disk unit by said receiving hole and the stepped screw which is inserted into said receiving hole with a gap between the stepped screw and said receiving hole and another gap between a head of the stepped screw and a side surface of said first plate, whereby said stepped screw serves as a stopper with respect to relative movement between said first and second metal plates when an excessive impact is applied.

4. A device for attaching a magnetic disk unit according to claim 2, wherein said first plate is provided with a receiving hole having a diameter larger than a diameter of a stepped screw inserted into said receiving hole, said first plate being secured to the magnetic disk unit by said receiving hole and the stepped screw which is inserted into said receiving hole with a gap between the stepped screw and said receiving hole and another gap between a head of the stepped screw and a side surface of said metal plate, whereby said stepped screw serves as a stopper with respect to relative movement between said first and second metal plates when an excessive impact is applied.

* * * * *